United States Patent [19]
Kawabata et al.

[11] Patent Number: 4,678,831
[45] Date of Patent: Jul. 7, 1987

[54] BLOCK COPOLYMERS AND RESIN COMPOSITIONS

[75] Inventors: Juheiji Kawabata; Toshinori Sugie, both of Takaishi; Fumihiro Kobata, Izumi; Akira Hirayama, Chiba, all of Japan

[73] Assignee: Dainippon Ink and Chemicals, Inc., Tokyo, Japan

[21] Appl. No.: 845,455

[22] Filed: Mar. 28, 1986

[30] Foreign Application Priority Data

Mar. 30, 1985 [JP] Japan ................................. 60-67726
Apr. 26, 1985 [JP] Japan ................................. 60-90678
Nov. 19, 1985 [JP] Japan ................................. 60-257870
Nov. 22, 1985 [JP] Japan ................................. 60-261309

[51] Int. Cl.$^4$ .............................................. C08K 3/04
[52] U.S. Cl. .................................... 524/496; 524/609; 528/388; 528/391; 525/535; 525/536; 525/537
[58] Field of Search ................ 528/388, 391; 525/535, 525/536, 537; 524/496, 609

[56] References Cited
U.S. PATENT DOCUMENTS 4,301,274  11/1981  Campbell ............................ 528/391
4,489,129  12/1984  Shue et al. .......................... 524/609

Primary Examiner—Melvyn I. Marquis
Attorney, Agent, or Firm—Sherman and Shalloway

[57] ABSTRACT

A block copolymer comprising a polyphenylenesulfide portion and a polysulfone portion, and having a logarithmic viscosity [η] in the range of 0.03 to 1.0, said logarithmic viscosity [η] being a value calculated by the following equation from a relative viscosity measured at 206° C. for a solution of a polymer in α-chloronaphthalene in a polymer concentration of 0.4 g/100 ml.

[η]=ln (relative viscosity)/polymer concentration;

and a resin composition comprising a block copolymer composed of a polyphenylenesulfide portion and a polysulfone portion, polyphenylenesulfide and/or polysulfone, and if required, a filler.

10 Claims, No Drawings

BLOCK COPOLYMERS AND RESIN COMPOSITIONS

This invention relates to a block copolymer comprising a polyphenylenesulfide (hereinafter abbreviated as "PPS") portion and a polysulfone portion, and to a resin composition comprising the copolymer, PPS and/or polysulfone, and if required, a filler. More particularly, this invention relates to a block copolymer wherein polysulfone is chemically bonded as a soft segment to PPS, said block copolymer having improved mechanical properties such as impact strength and flexibility, and to a resin composition containing the copolymer.

PPS has drawn much interest as high-performance engineering plastics having prominent heat resistance, chemical resistance and rigidity compared to engineering plastics such as nylons, polycarbonates, polybutylene terephthalate and polyacetals. This resin has however a serious drawback that it has poor toughness and is brittle compared to the above engineering plastics. In recent years, linear PPS different from the conventional heat-crosslinked PPS has been developed, but it is poor in impact strength and elongation in crystalline state.

Fillers such as glass fibers have been so far compounded to improve the impact strength of PPS, which is nevertheless ineffective for e.g. prevention of occurance of cracks owing to molding shrinkage strain.

On the other hand, blending with flexible polymers is a valid method. However, this method has suffered problems with decrease in mechanical strengths such as flexural strength, etc. and deterioration of a surface condition of molded articles because there are few flexible polymers having excellent heat resistance and chemical resistance, and compatibility with PPS is not enough. Accordingly, PPS having improved impact strength and flexibility without losing its own characteristics has not yet been produced.

An object of this invention is to obtain, in view of the foregoing situation, a PPS resin having improved mechanical strengths such as impact strength, etc. and excellent blend compatibility. For achieving the very object, the present inventors have made extensive studies, and consequently found that a block resin is effective which is obtained by copolymerizing PPS and polysulfone having reactive end groups, and chemically bonding both components.

Thus, the present invention is to provide a block copolymer comprising a PPS portion and a polysulfone portion, and having a logarithmic viscosity [η] in the range of 0.03 to 1.0, said logarithmic viscosity [η] being a value calculated by the following equation from a relative viscosity measured at 206° C. for a solution of a polymer in α-chloronaphthalene in a polymer concentration of 0.4 g/100 ml,

[η] = ln(relative viscosity)/polymer concentration as well as a process for the preparation of same.

The present invention is further to provide a resin composition comprising a block copolymer composed of a PPS portion and a polysulfone portion, PPS and/or polysulfone, and if required, a filler.

It is advisable that the PPS portion constituting the block copolymer in this invention contains at least 70 mol % of structural units represented by formula

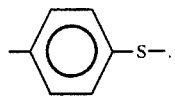

If said amount is less than 70 mol %, a block copolymer having excellent properties is not obtainable. It is moreover advisable that the PPS portion has a logarithmic viscosity [η] in the range of 0.03 to 0.80, said logarithmic viscosity being a value calculated by the following equation from a relative viscosity measured at 206° C. for a solution of a polymer in α-chloronaphthalene in a polymer concentration of 0.4 g/100 ml.

[η] = ln(relative viscosity)/polymer concentration

Examples of a method for producing this polymer are a method wherein halo-substituted aromatic compounds (e.g. p-dichlorobenzene) are polymerized in the presence of sulfur and sodium carbonate; a method wherein halo-substituted aromatic compounds are polymerized in a polar solvent and in the presence of sodium sulfide, or sodium sulfide and sodium hydroxide, or hydrogen sulfide and sodium hydroxide, or hydrogen sulfide and sodium aminoalkanoate; and a method wherein p-chlorothiophenol is subjected to self-condensation. Suitable is a method wherein sodium sulfide is reacted with p-dichlorobenzene in amide-type solvents such as N-methylpyrroridone and dimethylacetamide or sulfone-type solvents such as sulfolane. On this occassion, it is advisable that alkali metal salts of carboxylic acid and sulfonic acid or an alkali hydroxide is added to adjust a degree of polymerization. The following linkages may be contained as a copolymerizable component in an amount of less than 30 mol % because they exert no great influence on crystallinity of the polymer.

Meta-linkage: 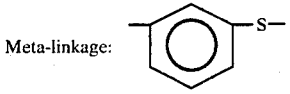

Ortho-linkage: 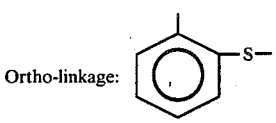

Ether-linkage: 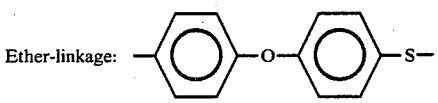

Sulfone-linkage: 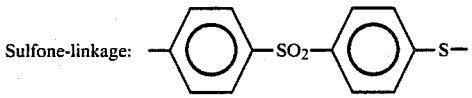

Biphenyl-linkage: 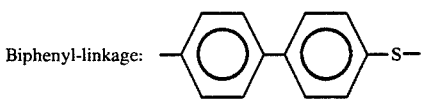

Substituted phenyl sulfide linkage: 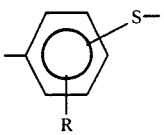

wherein R denotes an alkyl group, a nitro group, a phenyl group, an alkoxy group, a carboxylic acid group or a group of carboxylic acid metal salt.

Trifunctional linkage: 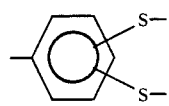

Preferably, the amount of the copolymerizable component is 10 mol % or less. Especially, when the trifunctional or higher phenyl, biphenyl or naphthyl sulfide linkage is selected as the copolymerizable component, the amount is 3 mol % or less, more preferably 1 mol % or less.

Concrete examples of a method for producing such PPS include:

(1) A method using halo-substituted aromatic compounds and alkali sulfides (see U.S. Pat. No. 2,513,188 and Japanese patent publications Nos. 27671/69 and 3368/70)

(2) A method wherein a condensation reaction is performed in the presence of alkali catalysts of thiophenols or copper salts (see U.S. Pat. No. 3,274,165 and British patent No. 1,160,660)

(3) A method wherein aromatic compounds and sulfur chloride are subjected to a condensation reaction in the presence of a Lewis acid catalyst (see Japanese Patent Publication No. 27255/71 and Belgian Patent No. 29437)

The block copolymer in this invention is obtained by, for example, reacting the end group of polysulfone with the end group of PPS. Accordingly, when the end group of polysulfone is e.g. a chlorophenyl group

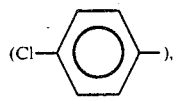

the end group of PPS has to be a reactive group such as a sodium sulfide group (NaS—). Examples of a method for obtaining such PPS include a method wherein the reaction is performed such that the amount of the sodium sulfide component is 1 to 20 mol % more than that of the p-dichlorobenzene component, and a method wherein a binder such as sodium sulfide is added as a third component at the point of the copolymerization reaction with polysulfone.

On the other hand, the polysulfone portion constituting the block copolymer in this invention is defined to be a polyaryline compound wherein arylene units are arranged either at random or regularly along with ether and sulfone linkages. Examples of such polysulfone portion are those represented by the following structural formulas ①~⑬ (wherein n is an integer of 10 or more). Those represented by the structural formulas ① and ⑥ are preferable.

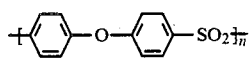  (1)

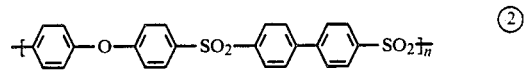  (2)

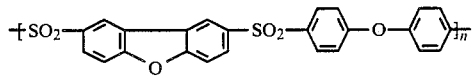  (3)

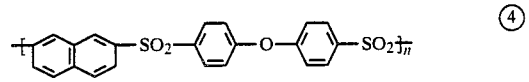  (4)

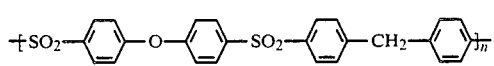  (5)

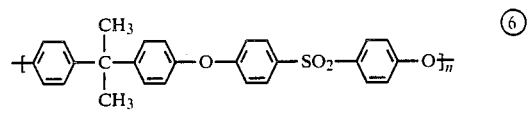  (6)

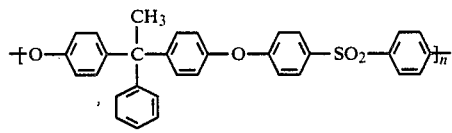  (7)

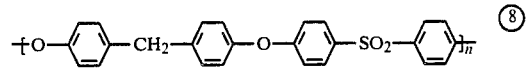  (8)

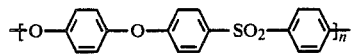  (9)

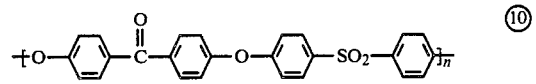  (10)

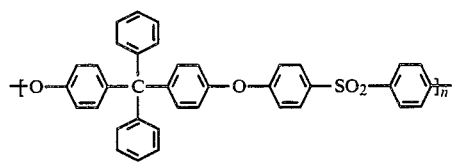  (11)

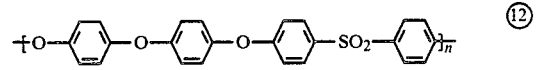  (12)

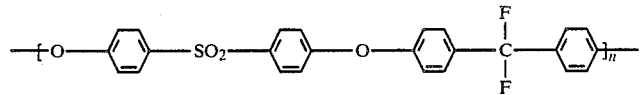  (13)

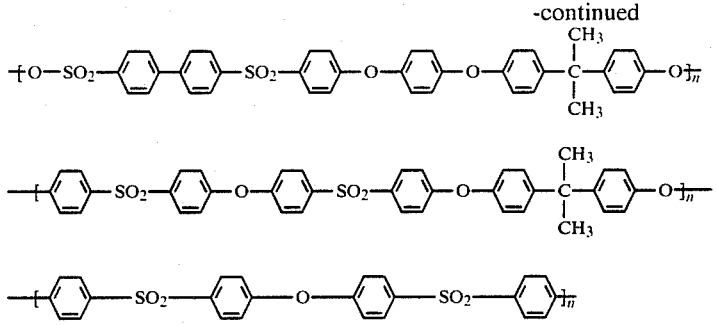

14

15

16

The above polysulfone portion has preferably a reduced viscosity [$\eta_{sp}/C$] in the range of 0.05 to 1.0, said reduced viscosity being a value calculated by the following equation from a relative viscosity measured at 25° C. for a solution of a polymer in chloroform in a polymer concetration of 0.2 g/100 ml.

[$\eta_{sp}/C$] = (relative viscosity − 1)/polymer concentration

As a method for producing this polymer, there can be a method wherein dichlorodiphenylsulfone is reacted with a sodium salt of 2,2-bis(4-hydroxyphenyl)propane (Japanese patent publication No. 7799/67).

In case the block copolymer in this invention is formed by reacting the end group of polysulfone with the end group of PPS, it is advisable to use polysulfone obtained by reacting the dichlorodiphenylsulfone component with the bis(4-hydroxyphenyl)-propane component such that the amount of the former is 1 to 20 mol % larger than that of the latter, or to add a binder such as dichlorodiphenylsulfone as a third component at the time of copolymerizing PPS with polysulfone.

In the copolymerization reaction, proportions of PPS and polysulfone vary depending on intended properties. A weight ratio of the polysulfone component to the PPS component is usually 1-99/99-1, preferably 5-90/95-10. Where the weight ratio is less than 1/99, an effect of an impact strength imparted by polysulfone cannot be developed. Where it exceeds 99/1, the intended effect is not attainable. This is therefore undesirous.

It is most preferable that the numbers of reactive end groups in PPS and polysulfone are the same in producing the block copolymer. The reason is that in this instance the block copolymer can be formed in good yield. Meanwhile, when the number of reactive end groups in one of the components is larger than the number of reactive end groups in the other component, the block copolymer alone can be recovered by removing the unreacted homopolymer component on fractionation or extraction after the reaction terminates.

It is advisable that the solvent employed in the polymerization reaction is an organic polar solvent being substantially liquid at the reaction temperature and pressure. Examples of such solvent are amides, ureas and lactams such as formamide, acetamide, N-methylformamide, N,N-dimethylformamide, N,N-dimethylacetamide, 2-pyrrolidone, N-methyl-2-pyrrolidone, N-ethyl-2-pyrrolidone, ε-caprolactam, N-methyl-ε-caprolactam, hexamethylphosphoramide, tetramethylurea and 1,3-dimethyl-2-imidazolidonone; sulfones such as sulfolane and dimethylsulfolane; nitriles such as benzonitrile; ketones such as methyl phenyl ketone; and mixtures of these compounds. Of these solvents, aprotic organic polar solvents such as amides, lactams and sulfones are most preferable. The amount of the organic polar solvent is 2 to 20, preferably 3 to 10 by weight ratio relative to the amount of the polymer components.

That the product resulting from the block copolymerization is a block copolymer of PPS and polysulfone chemically bonded to each other is ascertained by the fact that even if the obtained polymer is repeatedly extracted with N-methylpyrrolidone or chloroform being a good solvent of polysulfone, the amount of polysulfone contained in the polymer cake does not reduce. On the other hand, whether or not unreacted PPS is contained in the copolymerization reaction product can be ascertained by checking whether or not PPS precipitates when the product is mixed with α-chloronaphthalene and dissolved at 210° C. and the mixture is cooled to 160° C.

The resin composition in this invention contains PPS, when used conjointly, in an amount of 1 to 97 parts by weight, preferably 10 to 90 parts by weight per 3 to 100 parts by weight, preferably 10 to 100 parts by weight of the block copolymer. Said composition contains polysulfone, when used conjointly, in an amount of 1 to 60 parts by weight, more preferably 10 to 40 parts by weight on the same basis.

The resin composition in this invention provides a great effect of improvement in impact strength and an excellent compatibility by containing 3 to 100 parts by weight of the block copolymer.

The resin composition in this invention can be afforded by carrying out the reaction such that the amount of one of the PPS component and the polysulfone component is larger than that of the other when producing the block copolymer. On this occassion, the presence of free PPS and polysulfone can be ascertained by the fact that a fixed amount of polysulfone is contained in the polymer even if the polymer is repeatedly extracted with N-methylpyrrolidone or chloroform being a good solvent of polysulfone. While, whether or not a PPS homopolymer is contained can be confirmed by a fractional precipitation test using α-chloronaphthalene.

The block copolymer and the resin composition in this invention can contain 70% by weight or less of an optional reinforcing agent or a filler for improving properties as engineering plastics, such as strength, heat resistance and dimensional stability. Examples of the reinforcing agent or the filler are fibrous reinforcing agents such as glass fibers, carbon fibers, calcium titanate, asbestos, silicon carbide, ceramic fibers, metallic fibers and silicon nitride; inorganic fillers such as ballium sulfate, calcium sulfate, caolin, clay, pyrophyllite, bentonite, sericite, zeolite, mica, nepheline syenite, talc, attapulgite, wollastnite, PMF, ferrite, calcium silicate, calcium carbonate, magnesium carbonate, lithium carbonate, dolomite, antimony trioxide, zinc oxide, titanium oxide, magnesium oxide, iron oxide, molybdenum dioxide, graphite, gypsum, glass bead, glass balloon and quartz powder; and organic reinforcing agents such as aramid fibers. When these reinforcing agents or fillers are added, it is possible to use a known silane coupling agent.

Other additives effective for providing heat stability, such as compounds having a benzotriazole group or an imidazole group, and carbodiimide compounds are also usable.

The resin composition containing carbon fibers as a reinforcing agent in this invention is desirable because it can provide a molded article having better heat resistance. Available carbon fibers are relatively long, and commonly 7 mm or more, preferably 1 cm or more in length. Any fibers of rayon, polyacrylonitrile and pitch types will do and can take forms of yarn, roving, cut fiber, woven fabric, knitted fiber and braid. By the way, glass fibers and organic fibers such as aramid fibers and aromatic polyester fibers may be conjointly used as other reinforcing fibers.

A resin component to carbon fiber weight ratio (solids content) is usually 20/80 to 80/20, preferably 30/70 to 60/40.

A method for impregnating the resin composition of this invention into carbon fibers is not limited in particular. For example, a resin powder, slurry or solution can be impregnated by a spray. Or the resin composition of this invention may be melted on heating preferably at 300 to 360° C., impregnated in carbon fibers either stepwise or continuously and molded. On this occassion, the resin is subjected to radiofrequency heating in the presence of a sensitizer. Molding is usually carried out at 300 to 360° C. and at least 100 kg/cm$^2$, followed by annealing or quenching.

In the carbon fiber-containing resin composition (CFRP) of this invention, the use of a matrix resin that keeps heat resistance and chemical resistance of PPS and has improved flexibility suppresses occurrence of thermal cracks and prevents decrease in strength or ILSS (interlaminar shear strength) accompanied by degradation of carbon fibers at the time of heat-crosslinking of PPS. Accordingly, CFRP in this invention is high-performance CFRP free of degradation of carbon fibers and thermal cracks attributable to PPS as well as having excellent heat resistance and chemical resistance of PPS and adhesion to carbon fibers. It can be utilized in aeronautics and space.

The block copolymer and the resin composition in this invention can be used as films. A density of the resin films varies with type of polysulfone in the block copolymer and is preferably 1.30 to 1.46 g/cm$^3$. Such films may contain aids of improving slipperiness and film processability, for example, inorganic fillers such as talc, mica, calcium carbonate and metallic oxides. The films may further contain stabilizers or antioxidants such as phenolic amide compounds and hydrazide group-containing compounds.

The films of this invention may be either oriented or unoriented films. The oriented films, above all, biaxially oriented films are preferable. A method for producing the resin films in this invention will be described hereinafter.

First of all, the block copolymer or the composition containing said block copolymer in this invention is molded into a sheet or a film by means of an extruder, a press, and so forth, and the resulting product is then quenched using a liquid nitrogen, water and a roll to obtain an unoriented film wherein the PPS portion and the polysulfone portion are both nearly amorphous. As the unoriented film proceeds to crystallize, a stretchability lowers and the film is apt to break at the point of stretching.

A stretch temperature of the unoriented film somewhat varies with the molecular weight or components of the polymer. It is usually 80 to 150° C., preferably 90° to 140° C. The unoriented film can be stretched conveniently by an ordinary method such as a roll method, a tenter method or a tubular method. From the aspects of properties and producibility of the resulting film, a stretch ratio is 2.5 to 7.0, preferably 3.0 to 5.5. Either simultaneous biaxial stretching or sequential biaxial stretching is available. Monoaxial stretching is also possible.

The thus obtained oriented or unoriented film is heat treated under tension at a temperature of 150 to 350° C. for 0.1 to 600 seconds to crystallize the PPS portion. At the heat treating temperature in excess of 350° C., the film becomes molten even if the heat treating time is shortened, making it impossible to retain the form of the film. The film can be heat set without rendering it molten, by properly adjusting the heat treating temperature of 150° to 350° C. and the heat treating time of 0.1 to 600 seconds according to the composition and the molecular weight of the polymer.

The thus heat set oriented film sometimes shows a high value when a heat shrinkability is measured by a method wherein a temperature is gradually raised from e.g. room temperature or a method wherein direct contact is effected in a high-temperature atmosphere. Accordingly, said film is at times undesirous as a material used under heating.

It is however possible to minimize a heat shrinkability and improve a dimensional stability under heating by properly heating the heat set film monoaxially or biaxially at a temperature of 150 to 350° C., preferably 200 to 330° C. for a period of time up to 10 minutes with restricted shrinkage or elongation within 25%, preferably 15%, or under a fixed length.

The heat treatment in this invention is carried out by contacting a heated gas, liquid or solid with the untreated film. Radiation by an infrared heater and ultrasonic wave or radiofrequency irradiation are also available. The heat treating temperature and time in this invention mean, in case of using a medium, a temperature of a heating medium and a time of contacting with the heating medium; and in case of using the infrared heater, ultrasonic wave or radiofrequency, a temperature and a treating time of the film.

Unlike a composition comprising a mere blend of PPS and polysulfone less compatible with PPS, the resin film in this invention, containing the PPS chain and the polysulfone chain, is good at film-forming properties, biaxial stretchability and mechanical properties such as tear resistance, etc. Since said resin film has excellent mechanical properties such as tear strength, it is most suitable as a film for electrical insulation and magnetic recording, such as a base film for flexible print circuit board, an insulating material for various rotators, e.g. a vehicle motor and a motor for refrigerator or various static apparatuses, an insulating material for coating of common cables and high or ultrahigh pressure cables, a base film for magnetic tapes or a film for condenser. Said film is also available as a packaging, agricultural, photographic or sticky tape base and a film for building materials and decoration. Further, said film is usable as a laminate with other films or a composite material comprising a combination of it with metals or paper.

The block copolymer and the resin composition in this invention can be applied to compositions with thermoplastic resins such as polyphenylene oxide, polyarylates, polyamides, polybutylene terephthalate, polyether ether ketones, polyimides and liquid crystalline polymers such as aromatic polyesters; epoxy resins such as novolac-type epoxy resins; polyolefins such as polyethylene and polypropylene; α-olefin copolymers such as maleic acid-modified polypropylene; and thermoplastic elastomers such as a nylon 11/polyether polyamide elastomer and a hydrogenated conjugated diene-styrene copolymer.

Thus, the block copolymer and the resin composition in this invention are not only used to encapsulate electric and electronic parts such as IC, condensers and transistors, but also applied to conventional injection molded articles such as car components, extrusion molded articles such as fibers, sheets, films and tubes, and blow molded articles.

The block copolymer and the resin composition of this invention are, different from the composition comprising the mere blend of PPS and polysulfone less compatible with PPS, formed by block-copolymerizing the PPS chain with the polysulfone chain, so that they are excellent in mechanical properties such as flexural strength and impact strength as well as in compatibility with PPS and polysulfone.

The following Examples illustrate this invention in more detail. However, this invention is not limited to these Examples.

EXAMPLE 1 AND COMPARATIVE EXAMPLES 1-2

First, a chlorophenyl end group-containing polysulfone was formed as follows.

A 5-liter glass flask was charged with 343 g (1.50 mols) of bis(4-hydroxyphenyl)-propane (hereinafter abbreviated as "bisphenol A"), 1,000 ml of dimethylsulfoxide and 2,000 ml of monochlorobenzene, and heated at 60 to 80° C. The system was purged with nitrogen. Subsequently, 240 g (3.0 mols) of a 50% sodium hydroxide aqueous solution was added dropwise for 10 minutes with vigorous stirring. The system was separated into a chlorobenzene phase and an aqueous phase of disodium salt of bisphenol A in dimethyl sulfoxide. Thereafter, the reaction mixture was refluxed while purging the system with nitrogen, water was expelled by azeotropy and chlorobenzene was returned to the system. The temperature of the inside was raised from 120° C. to 140° C., most of water in the system was evaporated, and disodium salt of bisphenol A was precipitated. The temperature inside the system was elevated to 150° to 160° C. to evaporate chlorobenzene and redissolve the precipitate. Thereafter, a 50% chlorobenzene solution of 448 g (1.56 mols) of dry 4,4'-dichlorodiphenylsulfone was added over the course of 10 minutes while maintaining the temperature at 110° C. On this occassion, the inside of the system was adjusted to a temperature of 150° to 160° C. After the addition of dichlorodiphenylsulfone, the reaction was carried out at 160° C. for 3 hours to afford an amber, sticky polymer solution. The solution was cooled and diluted with 1,000 ml of chlorobenzene, and by-product sodium chloride was removed by filtration. The resulting solution was then poured in methanol in an amount five times that of the polymer solution to precipitate the polymer. The thus obtained white precipitate was dissolved in chloroform, washed with water and reprecipitated with chloroform and methanol. The precipitate was dried at 130° C. under reduced pressure to obtain 633 g of white polysulfone (yield 96.0%) having a reduced viscosity $[\eta_{sp}/C]$ of 0.34, which was a value calculated by the following equation from a relative viscosity measured at 25° C. for a solution of a polymer in chloroform in a polymer concentration of 0.2 g/100 ml.

$[\eta_{sp}/C]$ = specific viscosity/polymer concentration

Next, PPS containing a sodium sulfide end group was formed as follows.

A 10-liter autoclave was charged with 3,500 g of N-methylpyrrolidone, 1,153 g (8.80 mols) of sodium sulfide 2.7-hydrate and 4.0 g (0.10 mol) of sodium hydroxide. With stirring, the mixture was heated to 200° C. for about 2 hours under an atmosphere of nitrogen to evaporate 250 ml of water. After the reaction system was cooled to 150° C., 1,176 g (8.0 mols) of p-dichlorobenzene and 800 g of N-methylpyrrolidone were added, and the mixture was reacted at 230° C. for 1 hour and then at 260° C. for 2 hours. When polymerization terminated, the internal pressure was 7.1 kg/cm$^2$. The reaction vessel was cooled, and part of the content was sampled and separated by filtration. Thereafter, the solid content was washed three times with hot water on boiling and then twice with acetone, and dried at 120° C. to obtain a slightly grayish brown PPS polymer powder (yield about 94%). The polymer had a logarithmic viscosity of 0.14, which was a value calculated by the following equation from a relative viscosity measured at 206° C. for a solution of a polymer in α-chloronaphthalene in a polymer concentration of 0.4 g/100 ml.

$[\eta]$ = ln(relative viscosity)/polymer concentration

Successively, 300 g of the above polysulfone and 1,300 g of N-methylpyrrolidone were added to 2,360 g of the PPS-containing polymerization mixture in the reaction vessel. After purged with nitrogen, the system was sealed and heated to 230° C. The reaction was conducted at this temperature for 2 hours. After the reaction vessel was cooled, the content was separated by filtration, and the solid content was washed twice with N-methylpyrrolidone and then three times with hot water on boiling. The resulting cake was dryed at 120° C. for 5 hours to obtain 528 g of a grayish brown polymer powder having $[\eta]$ of 0.27. An infrared absorption spectrum of the polymer powder revealed only peaks ascribable to absorptions of PPS and polysulfone. From intensities of absorptions observed at 1,390 cm$^{-1}$ and 1,240 cm$^{-1}$, the content of polysulfone in the polymer was measured and found to be 49.6% by weight. At the same time, the content of sulfur was determined by elemental analysis of the polymer and found to be 18.52%. It was ascertained that 49.6% by weight of polysulfone was contained in the polymer.

Moreover, the above polymer was subjected to a solvent extraction test. That is, Soxhlet extraction was performed for 2 hours using chloroform being a good solvent of polysulfone in an amount of 200 g per 10 g of the polymer. As a result, polysulfone was not eluted at all. An infrared absorption spectrum of the polymer recovered after the extraction test revealed that the content of polysulfone was 49.6% by weight. At the same time, the PPS blend containing 49.6% by weight of polysulfone was also subjected to the above extraction test. Consequently, polysulfone was completely eluted from the PPS blend.

On the other hand, the polymer and the PPS blend containing 49.6% by weight of the polysulfone were subjected to a fractional precipitation test in α-chloronaphthalene. 2 g each of the samples was mixed with 100 ml of α-chloronaphthalene, dissolved at 210° C. and then gradually cooled. As a result, the whole amount of PPS was precipitated at 160° C. from the solution of the blend, while PPS was not precipitated from the solution of the polymer, showing that the PPS homopolymer was not contained in the polymer.

From the foregoing results, it was ascertained that the copolymerization reaction product in this Example was a block copolymer with PPS chemically bonded to polysulfone.

The copolymer obtained in this Example was heat treated at 260° C. for 5 hours, then kneaded with a 30 mm twin-screw extruder on heating and pelletized. The resulting pellets were injection molded at 330° C. to form test pieces. A melt flow index (hereinafter abbreviated as "MI") was measured by a method of ASTM D-1238 (315° C., 5 kg load), a flexural strength by a method of ASTM D-790 and an Izod impact strength by a method of ASTM D-256. An external compatibility was observed with an unaided eye. A delamination condition of a molded article was determined by estimating with an unaided eye a condition after conducting a peel test through a method of adhering an adhesive tape to a cut surface of the test piece and then removing it.

In Comparative Example 1, using the polysulfone and the PPS powder treated as above in Example 1, a blend having the polysulfone content of 49.6% by weight was prepared, and test pieces were formed from the blend in the same way as above for measureing properties.

In Comparative Example 2, test pieces were formed using the PPS powder alone obtained in Example 1, and properties thereof were measured. The results are shown in Table 1.

TABLE 1

| Properties | Example 1 PPS/ polysulfone block copolymer | Comparative Example 1 Resin PPS/ polysulfone mixture | Comparative Example 2 PPS alone |
|---|---|---|---|
| MI (g/10 min) | 40 | 92 | 110 |
| Flexural strength (kg/cm$^2$) | 780 | 420 | 300 |
| Izod impact strength (unnotched kg · cm/cm) | 15.4 | 5.0 | 1.5 |
| External compatibility | Good | Poor | — |
| Delamination of a molded article | No | Yes | — |

As is apparent from Table 1, the copolymer has a notably low MI compared to PPS alone or the mixture, showing increase in melt viscosity owing to block copolymerization. From an external compatibility and a delamination condition of a molded article, it is presumed that the copolymer has a good dispersibility of both components, causing micro-phase separation. Moreover, the copolymer much improves in flexural strength and impact strength compared to the mixture. The copolymer is thus proved to be a resin having an improved impact strength.

EXAMPLE 2 & COMPARATIVE EXAMPLE 3

A sodium sulfide end group-containing PPS polymerization mixture was formed as in Example 1 except that 1,152 g (8.0 mols) of sodium benzoate was added together with sodium sulfide. Part of the polymerization mixture was sampled, and [η] thereof was measured and found to be 0.30.

3,710 g of the polymerization mixture was mixed with 210 g of a chlorophenyl end group-containing polysulfone ($\eta_{sp}$/C=0.35) formed as in Example 1 and 800 g of N-methylpyrrolidone. The system was purged with nitrogen, sealed and heated to 230° C. The reaction was performed at this temperature for 2 hours. The treatment was conducted as in Example 1 to afford 489 g of a grayish brown polymer powder having a logarithmic viscosity [η] of 0.36. An infrared absorption spectrum of the polymer powder revealed that the polysulfone content was 30.4% by weight. The chloroform extraction test and α-the chloronaphthalene fractional precipitation test described in Example 1 were carried out, and it was found that the PPS and polysulfone homopolymers were little recovered. It was consequently confirmed that the polymer obtained in this Example was almost a block copolymer.

The above copolymer was pelletized and injection molded to form test pieces. Moreover, in Comparative Example 3, using the polysulfone and PPS powder formed in Example 2, a blend having the polysulfone content of 30.4% by weight was obtained, and test pieces were produced from this blend. Properties thereof were then measured.

The results are shown in Table 2. As in Example 1, the copolymer improves greatly in impact strength and flexural strength compared to the mixture, and is a resin having improved impact strength.

TABLE 2

| Properties | Example 2 PPS/polysulfone block copolymer | Comparative Example 3 Resin PPS/polysulfone mixture |
|---|---|---|
| MI (g/10 min) | 21 | 50 |
| Flexural strength (kg/cm$^2$) | 1120 | 770 |
| Izod impact strength (unnotched kg · cm/cm) | 20.6 | 8.9 |
| External compatibility | Good | Poor |
| Delamination of a molded article | No | Yes |

EXAMPLE 3 & COMPARATIVE EXAMPLES 4–5

(A) Synthesis of a chlorophenyl end groupcontaining polysulfone

A 5-liter glass flask was charged with 366 g (1.60 mols) of bis(4-hydroxyphenyl)-propane (hereinafter abbreviated as "bisphenol A"), 1,000 ml of dimethyl sulfoxide and 2,000 ml of monochloro benzene, and heated at 60°–80° C., and the system was purged with nitrogen. Subsequently, with vigorous stirring, 256 g (3.20 mols) of a 50% sodium hydroxide aqueous solution was added dropwise for 10 minutes. The system was separated into a chlorobenzene phase and an aqueous phase of disodium salt of bisphenol A in dimethyl sulfoxide. Thereafter, while the system was purged with nitrogen, the reaction mixture was refluxed, water was expelled by azeotropy, and chlorobenzene was returned to the system. The internal temperature was elevated from 120° C. to 140° C., most of water in the system was evaporated, and the disodium salt of bisphenol A was precipitated. The temperature in the inside of the system was raised to 155° to 160° C. to evaporate chlorobenzene and redissolve the precipitate. Then, a 50% chlorobenzene solution of 478 g (1.66 mols) of dry 4,4'-dichlorodiphenylsulfone was added over the course of 10 minutes while keeping the temperature at 110° C. On that occassion, the inside of the system was adjusted to a temperature of 150 to 160° C. After the addition of dichlorodiphenylsulfone, the reaction was carried out at 160° C. for 3 hours to obtain an amber, sticky polymer solution. This solution was cooled and diluted with 1,000 ml of chlorobenzene, and by-product sodium chloride was removed by filtration. The residue was then poured in methanol in an amount five times that of the polymer solution to precipitate the polymer. The resulting white precipitate was dissolved in chloroform, washed with water and reprecipitated with chloroform and methanol. The precipitate was dried at 130° C. under reduced pressure to obtain 668 g of white polysulfone (yield 95.0%) having a reduced viscosity $[\eta_{sp}/C]$ of 0.34, which was a value calculated by the following equation from a relative viscosity measured at 25° C. for a solution of a polymer in chloroform in a polymer concentration of 0.2 g/100 ml.

$[\eta_{sp}/C]$=specific viscosity/polymer concentration (B) Synthesis of a block copolymer 290 g of polysulfone formed in (A) above and 1,300 g of N-methylpyrrolidone were added to 2,350 g of the PPS polymerization mixture in the reaction vessel in Example 1. The system was purged with nitrogen, sealed and then heated to 230° C. The reaction was conducted at this temperature for 2 hours. After the reaction vessel was cooled, the content was separated by filtration, and the solid content was washed twice with N-methylpyrrolidone and then three times with hot water on boiling. The resulting cake was dried at 120° C. for 5 hours to 510 g of a grayish brown polymer powder having $[\eta]$ of 0.25. An infrared absorption spectrum of the polymer powder revealed only peaks ascribable to absorptions of PPS and polysulfone. From intensities of absorptions observed at 1,390 cm$^{-1}$ and 1,240 cm$^{-1}$, the content of polysulfone in the polymer was determined and found to be 48.0% by weight. At the same time, the content of sulfur was determined by an elemental analysis of the polymer and found to be 18.89%. It was thus confirmed that 48.0% by weight of polysulfone was contained in the polymer.

Moreover, the above polymer was subjected to a solvent extraction test. That is, Soxhlet extraction was carried out for 2 hours using chloroform being a good solvent of polysulfone in an amount of 200 g per 10 g of the polymer. However, polysulfone was not eluted at all. An infrared absorption spectrum of the polymer recovered after the extraction test revealed that the content of polysulfone was 48.0% by weight.

From these results, it was ascertained that the copolymerization reaction product in Example 3 was a block copolymer with PPS chemically bonded to polysulfone.

(C) Preparation of a composition

The block copolymer obtained in (B) above was heat treated at 260° C. for 3 hours. A mixture comprising 50 parts by weight of the heat treated product and 50 parts by weight of PPS Ryton P$^{-4}$ (a product made by Philips Petroleum, U.S.A.) was kneaded with a 30 mm twin-screw extruder on heating, and pelletized. The pellets were injection molded at 330° C. to form test pieces. MI, a flexural strength, an Izod impact strength, an external compatibility and a delamination condition of a molded article were determined as in Example 1.

In Comparative Example 4, using the polysulfone and the PPS powder formed in Example 3, a blend having the polysulfone content of 48.0% by weight was prepared. From a mixture comprising 50% by weight of said blend and 50 parts by weight of said Ryton P$^{-4}$, test pieces were produced in the same way as above for measuring properties.

In Comparative Example 5, using only the PPS powder formed as in Example 3, similar test pieces were produced for measuring properties. The results are shown in Table 3.

TABLE 3

| | No. | | |
|---|---|---|---|
| | Example 3 | Comparative Example 4 | Comparative Example 5 |
| | Resin composition | | |
| Properties | PPS/polysulfone block copolymer composition | PPS/polysulfone mixture | PPS alone |
| MI (g/10 min) | 56 | 85 | 102 |
| Flexural strength (kg/cm$^2$) | 720 | 460 | 310 |
| Izod impact strength (unnotched kg · cm/cm) | 8.1 | 3.0 | 1.5 |
| External compatibility | Good | Poor | — |
| Delamination of a molded article | No | Yes | — |

The results in Table 3 reveal that the composition in this invention is lower in MI than PPS alone, etc., showing increase in melt viscosity owing to the presence of the block copolymer. From an external compatibility and a delamination of a molded article, it is presumed that the block copolymer has a good dispersibility, causing a micro-phase separation. Moreover, the composition of this invention improves in flexural strength and impact strength compared to the mixture, showing an improved impact resistance.

EXAMPLE 4

The block copolymer obtained in Example 3 was heat treated at 260° C. for 3 hours. A mixture comprising 80 parts by weight of the thus heat treated product and 20 parts by weight of polysulfone (Udel P—3703, a product made by Union Carbide Corporation, U.S.A.) was pelletized and injection molded as in Example 3 to form test pieces. Properties thereof were measured, and the results are shown in Table 4.

EXAMPLE 5

A sodium sulfide end group-containing PPS polymerization mixture was formed as in Example 3 except that 1,152 g (8.0 mols) of sodium benzoate was added together with sodium sulfide. Part of the polymerization mixture was sampled, and [$\eta$] thereof was measured and found to be 0.29.

3,690 g of the polymerization mixture was mixed with 210 g of a chlorophenyl end group-containing polysulfone ([$\eta_{sp}$/C]=0.35) formed as in Example 3 and 800 g of N-methylpyrrolidone. The system was purged with nitrogen, sealed and heated to 230° C. The reaction was carried out at this temperature for 2 hours. The reaction mixture was treated as in Example 3 to afford 489 g of a grayish brown polymer powder having a logarithmic viscosity [$\eta$] of 0.37. An infrared absorption spectrum of the polymer powder revealed that it contained 32.4% by weight of polysulfone. The chloroform extraction test and the α-chloronaphthalene fractional precipitation test described in Example 3 were carried out. As a result, PPS and polysulfone homopolymers were little recovered. It was thus confirmed that the polymer obtained in this Example was almost a block copolymer.

20 parts by weight of the copolymer was blended with 68 parts by weight of PPS Ryton P-—4 and 12 parts by weight of polysulfone (Udel P-—3703). From the resulting blend, test pieces were formed and measured for properties in the same way as in Example 1. The results are shown in Table 4.

EXAMPLE 6 & COMPARATIVE EXAMPLE 6

24 parts by weight of a product obtained by heat treating the block copolymer formed in Example 3 at 260° C. for 3 hours was mixed with 36 parts by weight of PPS Ryton P-—4 and 40 parts by weight of commercial glass fibers (CS-—03MA419 made by Asahi Fiber Glass K.K.). The mixture was kneaded by a twin-screw extruder on heating, pelletized and injection molded at 330° C. to form test pieces.

In Comparative Example 6, similar test pieces were produced using a PPS/polysulfone mixture containing 19.2% by weight of polysulfone obtained in Example 3, instead of the resin component in Example 6. Properties thereof were then measured, and the results are shown in Table 4.

The results in Table 4 reveal that the copolymer composition according to this invention are good at both flexural strength and impact strength even if compounded with the glass fibers.

TABLE 4

| | No. | | | |
|---|---|---|---|---|
| | Example 4 | Example 5 | Example 6 | Comparative Example 6 |
| | Resin composition | | | |
| Properties | PPS/polysulfone block copolymer composition | PPS/polysulfone block copolymer composition | PPS/polysulfone block copolymer composition 60 Glass fiber 40 | PPS/polysulfone mixture 60 Glass fiber 40 |
| MI (g/10 min) | 30 | 65 | 29 | 44 |
| Flexural strength (kg/cm$^2$) | 950 | 680 | 1700 | 1250 |
| Izod impact strength (unnotched kg · cm/cm) | 12.5 | 7.9 | 27.9 | 16.7 |
| External compatibility | Good | Good | Good | Poor |
| Delamination of a molded article | No | No | No | Yes |

EXAMPLE 7 & COMPARATIVE EXAMPLE 7

A chlorophenyl end group-containing polyether sulfone ([$\eta_{sp}$/C]=0.46) was obtained as in Example 3 except using 400 g (1.60 mols) of bis(4-hydroxyphenyl)sulfone instead of bisphenol A and 359 g (3.20 mols) of a 50% potassium hydroxide aqueous solution instead of a sodium hydroxide aqueous solution. This polymer was copolymerized with the PPS polymerization mixture obtained in Example 3 to afford 858 g of a polymer powder having [$\eta$] of 0.17, and containing 10.7% by weight of polyether sulfone. It was a composition comprising 19% by weight of the block copolymer and 81% by weight of the PPS component.

The above polymer composition was heat treated at 260° C. for 5 hours, pelletized and injection molded to form test pieces.

In Comparative Example 7, using a PPS/polyether sulfone mixture containing 10.7% by weight of polyether sulfone in example 7, test pieces were prepared in like manner and measured for properties. The results are shown in Table 5.

EXAMPLE 8 & COMPARATIVE EXAMPLE 8

A chlorophenyl end group-containing polysulfone ([$\eta_{sp}$/C]=0.65) was formed as in Example 3. Meanwhile, a sodium sulfide end group-containing PPS polymerization mixture was produced as in Example 1 except that 722 g (8.80 mols) of sodium acetate was added along with sodium sulfide. Part of the polymerization mixture was sampled, and [$\eta$] thereof was measured and found to be 0.30. Part of the polymerization mixture was copolymerized with said polysulfone to obtain a polymer powder having [$\eta$] of 0.40. This polymer powder was a composition comprising 48% by weight of the block copolymer component and 52% by weight of the PPS component.

The above copolymer composition was pelletized and injection molded to form test pieces. On the other hand, in Comparative Example 8, PPS and polysulfone in Example 8 were mixed such that the polysulfone content was the same as that in the copolymer composition. From the mixture, test pieces were formed and measured for properties. The results are shown in Table 5.

EXAMPLE 9

40 parts by weight of the copolymer composition obtained in Example 8 was mixed with 30 parts by weight of commercial glass fibers and 30 parts by weight of calcium carbonate. From the mixture, test pieces were produced in like manner and measured for properties. The results are shown in Table 5.

the above extraction test and fractional precipitation test, and it was found that the mixture contained about 70% by weight of the block copolymer and about 30% by weight of the PPS homopolymer.

Thereafter, said polymer powder was dispersed in chloroform to form a resin solution. A carbon fiber cloth (length/width=1/1) made of carbon fibers (Torayca T-—300; a product made by Toray Industries, Inc.) was immersed in said resin solution, and chloroform was removed by drying to form prepregs. The prepregs were laminated, and placed into a mold where they were heat-crosslinked at 350° C. for 40 minutes, pressurized at 120 to 420 kg/cm$^2$ and then cooled. At the time the mold was cooled to 140° C., the molded article was withdrawn. The content of carbon fibers in the molded article was adjusted to 60% by weight. The

TABLE 5

| | No. | | | | |
|---|---|---|---|---|---|
| | Example 7 | Comparative Example 7 | Example 8 | Comparative Example 8 | Example 9 |
| Properties | Resin composition | | | | |
| | PPS/polyether sulfone block copolymer composition | PPS/polyether sulfone mixture | PPS/polysulfone block copolymer composition | PPS/polysulfone mixture | PPS/polysulfone block copolymer composition 40 Glass fibers 30 Calcium carbonate 30 |
| MI (g/10 min) | 70 | 85 | 16 | 36 | 8 |
| Flexural strength (kg/cm$^2$) | 640 | 420 | 1100 | 750 | 1460 |
| Izod impact strength (unnotched kg · cm/cm) | 6.6 | 2.0 | 19.5 | 7.8 | 18.7 |
| External compatibility | Good | Poor | Good | Poor | Good |
| Delamination of a molded article | No | Yes | No | Yes | No |

EXAMPLE 10 & COMPARATIVE EXAMPLES 9–10

A chlorophenyl end group-containing polysulfone was produced by the reaction of bis(4-hydroxyphenyl)-propane with 4,4'-dichlorodiphenylsulfone. This polymer had a reduced viscosity $[\eta_{sp}/C]$ of 0.46, which was a value calculated by the following equation from a relative viscosity measured at 25° C. for a solution of a polymer in chloroform in a polymer concentration of 0.2 g/100 ml.

$[\eta_{sp}/C]$ = specific viscosity/polymer concentration

Subsequently, a sodium sulfide end group-containing PPS polymerization mixture was obtained by the reaction of sodium sulfide with p-dichlorobenzene in N-methylpyrrolidone. The polymer had a logarithmic viscosity $[\eta]$ of 0.15, which was a value calculated by the following equation from a relative viscosity measured at 206° C. for a solution of a polymer in α-chloronaphthalene in a polymer concentration of 0.4 g/100 ml.

$[\eta]$ = ln(relative viscosity)/polymer concentration

Successively, said polysulfone and N-methylpyrrolidone were added to the above PPS polymerization mixture, reacted at 230° C. for 2 hours and then cooled. The reaction mixture was washed well with N-methylpyrrolidone and water to obtain a grayish polymer powder having $[\eta]$ of 0.17. An infrared absorption spectrum and an elemental analysis of te polymer powder revealed that it was a mixture of PPS and a PPS/polysulfone block copolymer having the polysulfone content of 13.8% by weight. Said mixture was subjected to molded article was annealed at 150° C. for 1.5 hours, and then measured for a flexural strength and ILSS according to ASTM D-—2344 and ASTM D-—790 respectively. The results are shown in Table 6.

In Comparative Example 9, using the polysulfone powder obtained in Example 10 and a PPS powder formed by treating the PPS polymerization mixture in a usual manner, a mixture was prepared having the polysulfone content of 13.8% by weight. From this mixture, a molded article was produced as in Example 10. In Comparative Example 10, the PPS powder alone was immersed, and the molded article was withdrawn in like manner. The results are shown in Table 6. From said results, it follows that the molded article obtained from the polymer containing the PPS/polysulfone block copolymer is higher in flexural strength and ILSS than in case of not adding polysulfone or of using the PPS/polysulfone mixture.

TABLE 6

| | Flexural strength (kg/mm$^2$) | | ILSS (kg/mm$^2$) |
|---|---|---|---|
| | 23° C. | 150° C. | 23° C. |
| Example 10 | 92 | 37 | 7.4 |
| Comparative Example 9 | 85 | 36 | 6.4 |
| Comparative Example 10 | 63 | 33 | 3.7 |

EXAMPLE 11

A mixture of PPS and a PPS/polysulfone block copolymer (PPS/block copolymer weight ratio =15/85), said mixture containing 18.3% by weight of polysulfone, was synthesized in the same manner as in Example 10. The polymer had $[\eta]$ of 0.20. Said copolymer mixture was dispersed in a solution obtained by previously dissolving in chloroform polysulfone (Udel P-—3703, a product made by Union Carbide Corporation, U.S.A.; $[\eta_{sp}/C]=0.42$) such that the polysulfone content in the resin component was 5.0% by weight. There was thus formed a resin solution wherein the polysulfone content in the resin component was 23.3% by weight as a whole. Using said resin solution, a molded article was then produced as in Example 10 except that the heat-crosslinking time was changed to 30 minutes, and then withdrawn. Properties thereof were measured. As a result, flexural strengths at 23° C. and 150° C. were 94 kg/mm² and 41 kg/mm² respectively, and especially properties at high temperatures were good. Moreover, ILSS at 23° C. was 7.1 kg/mm² and good.

EXAMPLE 12-14 & COMPARATIVE EXAMPLES 11-13

(A) Synthesis of PPS containing a sodium sulfide end group

A 10-liter autoclave was charged with 3,500 g of N-methylpyrrolidone, 1,153 g (8.80 mols) of sodium sulfide 2.7-hydrate, 1,152 g (8 mols) of sodium benzoate and 4.0 g (0.10 mol) of sodium hydroxide. With stirring, the mixture was heated to 200° C. over the course of about 2 hours under an atmosphere of nitrogen to evaporate 250 ml of water. After the reaction system was cooled to 150° C., 1,176 g (8.0 mols) of p-dichlorobenzene and 800 g of N-methylpyrrolidone were added, and the mixture was reacted at 230° C. for 1 hour and then at 260° C. for 2 hours. When the reaction terminated, the internal pressure was 7.1 kg/cm². The reaction vessel was cooled, and part of the PPS polymerization mixture in the reaction vessel was sampled and separated by filtration. The solid content was washed three times with hot water on boiling and further twice with acetone, and then dried at 120° C. to obtain a slightly grayish brown PPS polymer powder (yield about 94%) having a logarithmic viscosity $[\eta]$ of 0.36, which was a value calculated by the following equation from a relative viscosity measured at 206° C. for a solution of a polymer in α-chloronaphthalene in a polymer concentration of 0.4 g/100 ml.

$[\eta]$ = ln(relative viscosity)/polymer concentration (B) Synthesis of a block copolymer To 3,680 of the PPS polymerization mixture in (A) above were added 210 g of polysulfone in Example 1 and 800 g of N-methylpyrrolidone. After purged with nitrogen, the system was sealed and heated to 230° C. The reaction was run at this temperature for 2 hours. The reaction vessel was cooled, the content was separated by filtration, and the solid content was washed twice with N-methylpyrrolidone and then three times with hot water on boiling. The resulting cake was dried at 120° C. for 5 hours to obtain 528 g of a grayish brown polymer powder having $[\eta]$ of 0.38. An infrared absorption spectrum of the polymer powder revealed only peaks ascribable to absorptions of PPS and polysulfone. From intensities of absorptions found at 1,390 cm⁻¹ and 1,240 cm⁻¹, the content of polysulfone in the polymer was determined and found to be 31.0% by weight. At the same time, the content of sulfur was determined by an elemental analysis of the polymer and found to be 22.72% by weight. It was thus ascertained that 31.0% by weight of polysulfone was contained in the polymer.

Moreover, the polymer powder was subjected to a solvent extraction text. That is, Soxhlet extraction was performed for 2 hours using chloroform being a good solvent of polysulfone in an amount of 200 g per 10 g of the polymer. As a result, polysulfone was not eluted at all. An infrared absorption spectrum of the polymer recovered after the extraction test revealed that the content of polysulfone was 49.6% by weight. At the same time, a PPS blend containing 31.0% by weight of the polysulfone was also subjected to the same extraction test. Consequently, the polysulfone was eluted completely from the PPS blend.

From these results, it was confirmed that the above copolymerization reaction product was a block copolymer with PPS chemically bonded to polysulfone.

(C) Formation of a film

The above copolymer was formed into a film at 310° C., and then quenched in water to obtain a transparent unoriented sheet having a thickness of 400 microns. The unoriented sheet was subjected to simultaneous biaxial stretching of 3.5 times ×3.5 times. After the film was heat set under tension at 270° C. for 60 seconds, properties thereof were measured. The results (in Example 12) are shown in Table 7.

In Example 13, the block copolymer formed in Example 12 was blended with the PPS polymer treated as above after polymerization reaction of PPS such that the content of polysulfone reached 15.0% by weight. From this blend, a film was prepared in like manner, and measured for properties.

In Comparative Examples 11 & 12, polysulfone formed in Example 12 was blended with the PPS polymer treated as above after polymerization reaction of PPS such that the contents of polysulfone became 31.0% by weight and 15% by weight respectively. Using the blends, films were formed in the above manner and measured for properties.

In Comparative Example 13, a film was formed in like manner using only the PPS powder obtained as in Example 12, and measured for properties.

In Example 14, 20 parts by weight of the block copolymer obtained in Example 12, 70 parts by weight of the PPS polymer formed by the above treatment after polymerization reaction of PPS, and 10 parts by weight of polysulfone yielded by the above treatment were blended, and the resulting blend was molded into a film. Properties thereof were then measured.

The results are shown in Table 7. From the data in Table 7, it becomes apparent that the films of this invention greatly improve in tensile strength compared to the films of Comparative Examples (films made of polymer blends).

TABLE 7

| | Example 12 | Example 13 | Comparative Example 11 | Comparative Example 12 | Comparative Example 13 | Example 14 |
|---|---|---|---|---|---|---|
| Proportions (parts by weight) | | | | | | |
| Block copolymer | 100 | 51 | 0 | 0 | 0 | 20 |
| PPS | 0 | 49 | 69 | 85 | 100 | 70 |
| Polysulfone | 0 | 0 | 31 | 15 | 0 | 10 |

TABLE 7-continued

| | Example 12 | Example 13 | Comparative Example 11 | Comparative Example 12 | Comparative Example 13 | Example 14 |
|---|---|---|---|---|---|---|
| Density (g/cm$^3$) | 1.30 | 1.31 | 1.30 | 1.31 | 1.36 | 1.31 |
| Tensile strength (kg/mm$^2$) | 11.2 | 12.0 | 10.1 | 10.5 | 13 | 10.4 |
| Elongation (%) | 100 | 75 | 36 | 32 | 56 | 70 |
| Tear strength (g) | 150 | 85 | 17 | 15 | 18 | 41 |
| Surface orientation coefficient | 0.78 | 0.76 | 0.49 | 0.60 | 0.80 | 0.75 |

The properties in Table 7 were measured by the following methods.

(1) Density:

A density was measured with a density gradient tube using a lithium bromide aqueous solution.

(2) Tensile test:

The heat set film was cut to a width of 5 mm and a length of 100 to 150 mm to form samples. Said samples were measured for tensile strength and elongation. In the tensile test, the samples were held with a grip by a Tensilon tester such that a sample length reached 50 mm, and stretched at a pulling rate of 200% min. On this occassion, the sample temperature was maintained at 23° C.

(3) Tear strength:

A tear strength was tested according to JIS P 8116-1976.

(4) Surface orientation coefficient of a film:

A surface orientation coefficient of a film was found by making a polar pattern from a crystal peak at $2\theta = 20°$-$21°$ in X-ray diffraction.

What we claim is:

1. A block copolymer comprising 1 to 99% by weight of a polyphenylenesulfide portion and 99 to 1% by weight of a polysulfone portion, and having a logarithmic viscosity [$\eta$] in the range of 0.03 to 1.0, said polyphenylenesulfide portion containing at least 70 mol% of structural units represented by the formula

—⟨C$_6$H$_4$⟩—S— and having a logarithmic viscosity [$\eta$] in the range of 0.03 to 0.80, said polysulfone portion having a structural formula selected from the group consisting of wherein n is an integer of 10 more, and having a reduced viscosity [$\eta_{sp}$/C] in the range of 0.05 to 1.0, said logarithmic viscosity $[\eta]$ being a value calculated by the equation $[\eta] = \ln(\text{relative viscosity})/\text{polymer concentration}$ from a relative viscosity measured at 206° C. for a solution of a polymer in α-chloronaphthalene in a polymer concentration of 0.4 g/100 ml, and said reduced viscosity $[\eta_{sp}/C]$ being a value calculated by the equation $[\eta_{sp}/C] = (\text{relative viscosity} - 1)/\text{polymer concentration}$ from a relative viscosity measured at 25° C. for a solution of a polymer in chloroform in a polymer concentration of 0.2 g/100 ml.

2. A resin composition comprising the block copolymer of claim 1 and 70% by weight or less of a filler.

3. A molded article of the copolymer of claim 1.

4. The molded article of claim 3 which is in the form of a film.

5. A resin composition comprising 3 to 100 parts by weight of the block copolymer of claim 1, 1 to 97 parts by weight of polyphenylenesulfide and/or 1 to 60 parts by weight of polysulfone, and optionally a filler.

6. A molded article of the composition of claim 5.

7. The molded article of claim 6 which is in the form of a film.

8. A resin composition comprising 3 to 100 parts by weight of the block copolymer of claim 1, 1 to 97 parts by weight of polyphenylenesulfide and/or 1 to 60 parts by weight of polysulfone, and carbon fibers, the weight ratio of the resin component composed of the block copolymer, polyphenylenesulfide and/or polysulfone/the carbon fibers being 20/80 to 80/20.

9. A molded article of the composition of claim 8.

10. A process for the preparation of a block copolymer having a logarithmic viscosity $[\eta]$ in the range of 0.03 to 1.0, said logarithmic viscosity $[\eta]$ being a value calculated by the equation $[\eta] = \ln(\text{relative viscosity})/\text{polymer concentration}$ from a relative viscosity measured at 206° C. for a solution of a polymer in α-chloronaphthalene in a polymer concentration of 0.4 g/100 ml, said process comprising reacting a sodium sulfide end group of polyphenylenesulfide with a chlorophenyl end group of polysulfone.

* * * * *

UNITED STATES PATENT AND TRADEMARK OFFICE
CERTIFICATE OF CORRECTION

PATENT NO. : 4,678,831

DATED : July 7, 1987

INVENTOR(S) : Juheiji Kawabata et al

It is certified that error appears in the above-identified patent and that said Letters Patent is hereby corrected as shown below:

Column 22, line 66, claim 1, after "10", insert -- or --.

Signed and Sealed this

Tenth Day of November, 1987

Attest:

DONALD J. QUIGG

*Attesting Officer*

*Commissioner of Patents and Trademarks*